(12) United States Patent
Kerpe et al.

(10) Patent No.: US 7,574,952 B2
(45) Date of Patent: Aug. 18, 2009

(54) MOTOR FLUID DRIVE, ESPECIALLY FOR ROTARY, PIVOTAL OR LINEAR DRIVE UNITS AND CORRESPONDING METHOD

(75) Inventors: Stefan Kerpe, Renningen (DE); Andreas Schuster, Wuestenrot/Neulautern (DE); Bruno Fellhauer, Brackenheim (DE); Andreas Stanicki, Nordheim (DE)

(73) Assignee: Schunk GmbH & Co. KG Spann- und Greiftechnik, Lauffen am Neckar (DE)

( * ) Notice: Subject to any disclaimer, the term of this patent is extended or adjusted under 35 U.S.C. 154(b) by 374 days.

(21) Appl. No.: 10/589,584

(22) PCT Filed: Feb. 21, 2005

(86) PCT No.: PCT/EP2005/001767

§ 371 (c)(1),
(2), (4) Date: Aug. 16, 2006

(87) PCT Pub. No.: WO2005/080817

PCT Pub. Date: Sep. 1, 2005

(65) Prior Publication Data

US 2008/0216641 A1    Sep. 11, 2008

(30) Foreign Application Priority Data

Feb. 20, 2004    (DE) .................... 10 2004 009 913

(51) Int. Cl.
*F01B 9/00* (2006.01)
(52) U.S. Cl. .................. 92/33; 92/136; 91/61

(58) Field of Classification Search ............... 92/2, 92/3, 31, 33, 136; 91/61
See application file for complete search history.

(56) References Cited

U.S. PATENT DOCUMENTS

| 5,577,433 | A | * | 11/1996 | Henry ................... 92/136 |
| 5,771,635 | A | * | 6/1998 | Skinner ................. 92/136 |
| 5,984,072 | A | | 11/1999 | Leimbach |
| 6,116,139 | A | * | 9/2000 | Yuda et al. ............. 92/136 |
| 2002/0129699 | A1 | | 9/2002 | Falcou |

FOREIGN PATENT DOCUMENTS

| DE | 803 251 | 4/1951 |
| DE | 44 13 999 | 10/1995 |
| DE | 195 07 689 | 9/1996 |
| DE | 297 20 838 | 4/1998 |
| DE | 101 28 340 | 1/2002 |
| EP | 0 163 602 | 12/1985 |

* cited by examiner

*Primary Examiner*—Michael Leslie
(74) *Attorney, Agent, or Firm*—Paul Vincent

(57) ABSTRACT

The invention relates to a drive, especially for rotary, pivotal or linear drive units, comprising a working piston (16), housed in a cylinder (12) of a housing (14), impinged by fluidic pressure media and displaced in the axial direction. The invention is characterized in that mechanical coupling elements (22, 24) are disposed on the working piston and can be coupled with a motor (30) in such a manner that the motor slows down and/or drives the working piston in the axial direction. The invention also relates to rotary, pivotal or linear drive units comprising said drive and to a method for operating a drive or a rotary, pivotal or linear drive unit.

14 Claims, 3 Drawing Sheets

MOTOR FLUID DRIVE, ESPECIALLY FOR ROTARY, PIVOTAL OR LINEAR DRIVE UNITS AND CORRESPONDING METHOD

This application is the national stage of PCT/EP2005/001767 filed on Feb. 21, 2005 and also claims Paris Convention priority of DE 10 2004 009 913.8 filed on Feb. 20, 2004.

BACKGROUND OF THE INVENTION

The invention concerns a rotary or pivotal unit having a drive as well as a method for operating thereof. The rotary or pivot unit comprises a working piston which is housed in a cylinder of a housing and can be loaded by fluid pressure media, as well as displaced in an axial direction.

Rotary or pivotal units of this type and their associated drives are widely used in automation systems, since they have a very high power density due to the fluid, in particular, pneumatic pressure media. The working piston may thereby be operatively connected, via a rotational coupling, to a pivot member which is borne to rotate within the housing. The motion of the piston in an axial direction thereby pivots the pivot part. The pivot part may e.g. have gripping means for gripping and pivoting workpieces.

Shock absorbers are conventionally used to move the piston to a certain target position to decelerate or delimit the linear motion of the working piston in the axial direction. The use of shock absorbers has many disadvantages. In particular, the shock absorbers cannot withstand the high loads at high pressures, and are disadvantageously subject to wear. For this reason, shock absorbers cannot provide reproducible damping rates on a long-term basis.

Shock absorbers are also relatively expensive, occupy space in or on the drive and restrict the power of the drive.

The use of shock absorbers is also disadvantageous in that the piston or the load moved by the drive cannot be moved to any position and can therefore not be disposed at any position. Positioning therefore requires appropriate mounting of a shock absorber or associated stop at a certain location. The position of the shock absorber or stop must therefore be changed to change positioning. The above-described conventional drives therefore lack flexibility.

It is the underlying purpose of the present invention to further develop a rotary or pivotal unit of the above-mentioned type which ensures high power density and increases the positioning capability and thereby the flexibility of the drive.

SUMMARY OF THE INVENTION

This object is achieved with a rotary or pivotal unit having the elements of the independent claim.

The working piston can be decelerated or driven at almost any position by using a motor which drives and/or decelerates the motion of the working piston in an axial direction via the coupling means. This increases the flexibility of the drive. The working piston can be freely positioned and be stopped and/or started at any position. Corresponding shock absorbers or stops that effect movement to a target position can be omitted. Motion towards a target position can be achieved through corresponding deceleration of the motion of the working piston.

In accordance with the invention, the working piston is thereby operatively connected, via a rotational coupling, to a pivoting member borne for rotation within the housing. The pivoting member can thereby be advantageously slowed, in a defined manner, at all pivot positions and angles.

Precise driving or deceleration of the working piston by the motor moreover realizes fine positioning or fine adjustment of the position of the working piston in the cylinder, and thereby exact positioning of the load to be moved. In accordance with the invention, the motor, which may be designed as an electromotor, is therefore suited to move the working piston to a target position, i.e. decelerate or drive it, and optionally move it to the target position in a fine adjustment mode.

There are conventional drives in automation systems, with which a rotary motion generated by an electromotor is transmitted into a linear motion, e.g. by a spindle drive or a toothed rack drive. This drive is advantageous i.a. due to free selection of position of the moved load and fast response thereof. The very small power density is, however, disadvantageous. Very powerful motors requiring a correspondingly large amount of space are required to dynamically move large loads. The mechanical coupling means thereof must moreover withstand large forces due to large loads and are therefore subjected to great wear.

The inventive combination of a fluid drive having high power density, and coupling of the working piston to a motor for driving and/or decelerating the working piston combines the advantages of fluid and, in particular, electric drives in a novel fashion. The high power density of a fluid drive is maintained and the flexibility of motor drive is additionally utilized.

A gas, such as e.g. air, or a hydraulic fluid, such as e.g. hydraulic oil, may be used as the fluid.

In a particularly advantageous embodiment of the invention, the mechanical coupling means comprise a spindle nut or spindle rod disposed on the working piston and a spindle rod or spindle nut which can be driven by the motor. The motor may thereby be operatively connected to the spindle nut or spindle rod either directly or indirectly, e.g. via a transmission. A circulating ball spindle may, in particular, be used. The use of a spindle rod/spindle nut improves the transmission ratio through which the working piston can be correspondingly driven or decelerated. A spindle nut or spindle rod may moreover be advantageously disposed on the piston, in particular, on one of its front ends. The spindle rod penetrates through the corresponding cylinder space and is operatively connected to the motor on the side facing away from the piston. No additional space is therefore required.

In accordance with another embodiment of the invention, the mechanical coupling means may comprise a toothed rack which is disposed on the working piston, and a pinion which can be driven by the motor. This also realizes advantageous driving or deceleration of the working piston in an axial direction. The toothed rack thereby advantageously penetrates through the cylinder space in an axial direction. No additional space is thereby required.

In accordance with the invention, the mechanical coupling means may also comprise a worm wheel which is rotated by the working piston via a rotary coupling, and a pinion that mates with the worm wheel and can be driven by the motor. This embodiment provides compact construction, in particular, in the longitudinal direction.

In order to obtain compact construction, the motor may be flanged to the housing. The housing and/or the motor may have corresponding flange sections. The motor may, however, also be designed as a hollow shaft motor which may be disposed at least partially within the working piston.

In a preferred embodiment of the invention, a regulation and/or control unit is provided which drives the motor in dependence on the position and/or the temporal change of position of the working piston and/or the respective pressure and/or the temporal change of the respective pressure in the pressure chambers of the cylinder. It may be driven e.g. with the aid of measuring systems which directly detect the position of the working piston or the position of an element which is motionally coupled to the working piston, e.g. a gripping means. The regulation and/or control unit may advantageously be programmed. Towards this end, predetermined target positions can be set which are then approached by the working piston through loading the working piston using pressure media and decelerating and/or positioning the working piston using the motor. When the working piston is moved by loading the piston, the motor also rotates freely without current or supports the motion caused by pressure load.

In accordance with the invention, a regulation and/or control unit may be provided, which directly drives the respective pressure in the pressure chambers of the cylinder when a limit load of the motor has been reached, such that the load on the motor is reduced and/or the motion of the working piston effected or controlled by the motor is supported. When the working piston reaches a predetermined target position, the motion of the working piston can be controlled by reducing the pressure in the corresponding pressure chamber, by loading the working piston with a counter pressure and/or by decelerating the motion through corresponding control and current supply to the motor. When an excessive load acts on the motor, the pressure chambers are driven such that the motion of the working piston is supported by the motor, thereby reducing the load acting on the motor. The motion of the motor is therefore power-assisted. This is advantageous in that a relatively small motor can be used for precise motion towards the target positions of the working piston, even when the working piston bears high loads.

The load acting on the motor can e.g. be determined by monitoring the motor current accepted by the motor. A torque sensor may also be provided on the motor shaft for determining the motor torque and thereby the load acting on the motor. The load may also be determined by the reaction moment of the motor, e.g. using corresponding sensors on the motor bearing or through detecting the amplitude of a rotatably borne or freely suspended motor.

It has turned out to be advantageous for the coupling means to have a high transmission ratio. A high transmission ratio permits use of motors having small dimensions, in particular, electromotors with low torque. The transmission ratio transforms the low output torque of the motor into a correspondingly large torque. For this reason, small motors can withstand even relatively high pressures in the cylinder space. The motion of the working piston can thereby be decelerated.

The invention also concerns a method for operating an inventive drive unit, wherein, upon loading the cylinder for moving the working piston, the motor is also rotated at least largely without load, or supports the motion of the working piston, wherein, upon or shortly before reaching the target position of the working piston, the motor is driven to decelerate the motion of the working piston. The pressure in the cylinder may, in particular, thereby be correspondingly reduced or a counter pressure be built up in the corresponding pressure chamber. The corresponding pressure chamber may also be kept pressure-free. Deceleration is effected in such a manner that the working piston reaches the target position.

Further features and details of the invention can be extracted from the following description which describes and explains the invention in more detail with reference to an embodiment shown in the drawing.

DESCRIPTION OF THE PREFERRED EMBODIMENT

Figure 1:
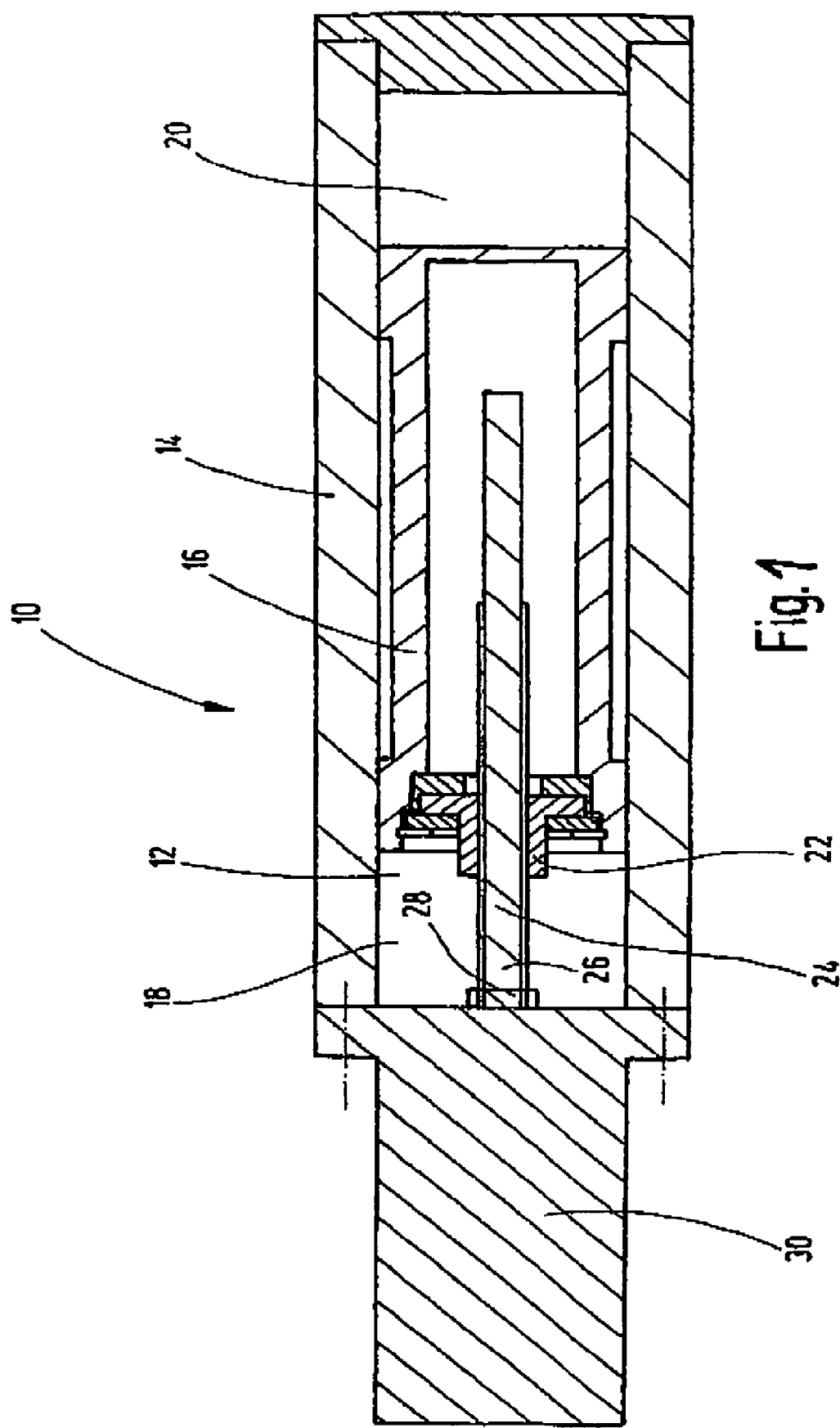
FIG. 1 shows a longitudinal section through a first inventive drive.

FIG. 1 shows a longitudinal section through an inventive drive 10. The drive 10 may be provided for a rotary, or pivotal unit. The drive 10 comprises a cylinder 12 in a housing 14. The cylinder 12 is shown as a one-piece, continuous cylinder. In accordance with the invention, the cylinder 12 may also comprise several cylinder sections each being formed by a cylinder tube. A working piston 16 is disposed in the cylinder 12 and divides the cylinder 12 into two pressure chambers 18 and 20. The pressure chambers 18 and 20 can be loaded with a pressure medium on alternating sides, such that the piston 16 moves in an axial direction. The piston 16 is coupled either directly or indirectly to means which are suited to move workpieces.

When the drive 10 is used in a rotary or pivotal drive unit, the working piston 16 is advantageously operatively connected to a pivot part which is rotatably disposed in the housing 14 via a rotary coupling (not shown). When the working piston is moved in an axial direction, the pivot part is rotated/pivoted.

A spindle nut 22, which is connected to the working piston 16 such that it cannot rotate relative thereto, is provided on a front end of the working piston 16. A spindle rod 24 is rotatably disposed in the spindle nut 22, whose free end 26 facing away from the piston 16 is disposed on a drive shaft 28 of an electromotor 30. The spindle rod 24 can therefore be rotated by the electromotor 30. When the spindle rod 24 is rotated, the working piston 16 can be moved in an axial direction by the spindle nut 22 which cooperates with the spindle rod 24. The spindle nut may, of course, also be rotatably coupled to the output shaft 28 of the electromotor 30. In this case, the spindle rod 24 is disposed on the piston 16 such that it cannot rotate relative thereto.

The spindle rod 24 and the spindle nut 22 form mechanical coupling means via which the motor 30 drives or decelerates the motor 30 in an axial direction.

The transmission ratio between the spindle rod 24 and the spindle nut 22 may thereby be such that self-locking between the spindle rod 24 and the spindle nut 22 is prevented. This ensures free rotation of the spindle shaft 24 when the piston 16 moves due to loading of the pressure chambers 18 or 20. The motor 30 is preferably switched off in this case. The rotor of the motor 30 rotates without being loaded.

The transmission ratio is moreover sufficiently high, such that an electromotor 30 having relatively small dimensions can be used to decelerate the motion of the piston 16.

The drive 10 advantageously comprises a regulation and control unit (not shown) which appropriately regulates the pressure load on the pressure chambers 18 and 20 and the electromotor 30 drive. Shortly before reaching a freely predetermined target position of the working piston 16, the pressure in the corresponding pressure chamber 18 or 20 can be reduced or a corresponding counter pressure can be built up and the electromotor 30 can be driven such that the motion of the working piston 16 is decelerated, thereby ensuring that a predetermined target position of the working piston 16 or a means connected to the working piston 16 is reliably reached. Measuring systems are advantageously provided which either detect the actual position of the working piston 16 or the actual position of a means coupled to the working piston 16.

The inventive drive 10 is advantageous in that it has high power density and also provides free and highly flexible positioning of the working piston 16 and of the load moved thereby. The high power density is achieved by pressurizing the pressure chambers 18, 20. High loads can be moved at high piston speeds, thereby still ensuring high flexibility. The mechanical coupling means and the electromotor 30 can freely position high loads.

When a predetermined target position of the working piston 16 has been reached, the motion of the working piston 16 is controlled by reducing the pressure in the pressure-loaded pressure chamber or by loading the working piston with a counter pressure and/or by decelerating the motion through corresponding drive and current supply to the motor 30. When the load acting on the motor 30 is excessively large, the pressure chambers 18, 20 are driven in such a manner that the motion of the working piston 16 is supported by the motor 30, thereby reducing the load acting on the motor 30. The motion of the motor 30 is thereby power-assisted. The load acting on the motor may e.g. be detected by a torque sensor on the motor shaft.

Figure 2:
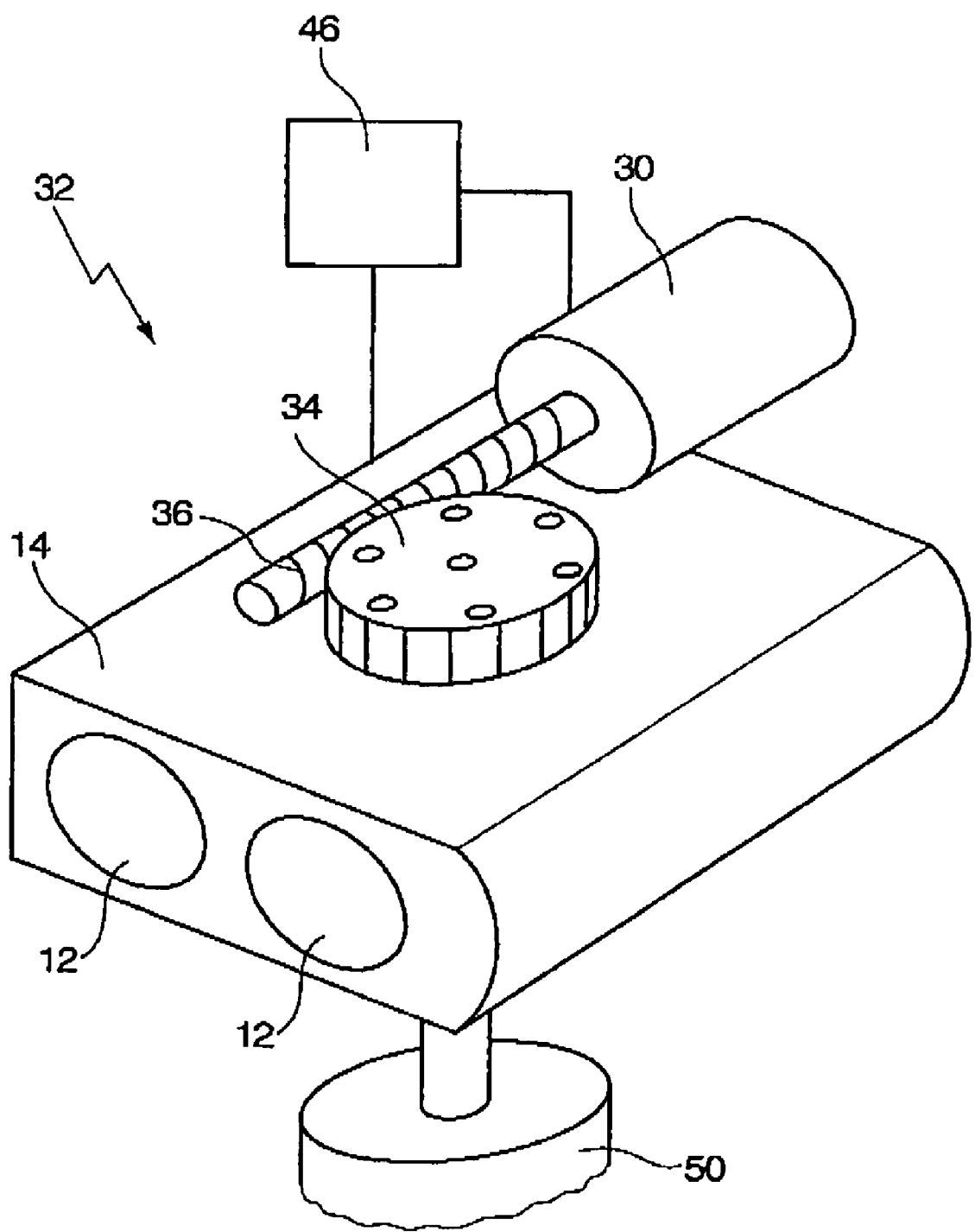
FIG. 2 shows a second embodiment of the invention.

FIG. 2 shows a pivotal drive 32 comprising two working pistons (not shown) which are housed in the cylinders 12 of a housing 14 and can be loaded by fluid pressure media and be displaced in an axial direction. Mechanical coupling means are provided on the working piston, which are coupled to the motor 30 in such a fashion that the working piston can be decelerated and/or driven by the motor 30. The mechanical coupling means thereby comprise a worm wheel 34 which is rotatably disposed, via a rotary coupling, in the housing 12 with the working piston and/or its piston rods, and a worm 36 which mates with the worm wheel 34 and can be driven by the motor 30. A regulation and control unit 46 communicates with both the electromotor 30 and the working piston 16 (disposed within cylinder 12 and therefore not visible in FIG. 2). A pivoting member 50 cooperates with the working piston 16 via a rotary coupling 44 (disposed within housing 14 and therefore not visible in FIG. 2).

Figure 3:
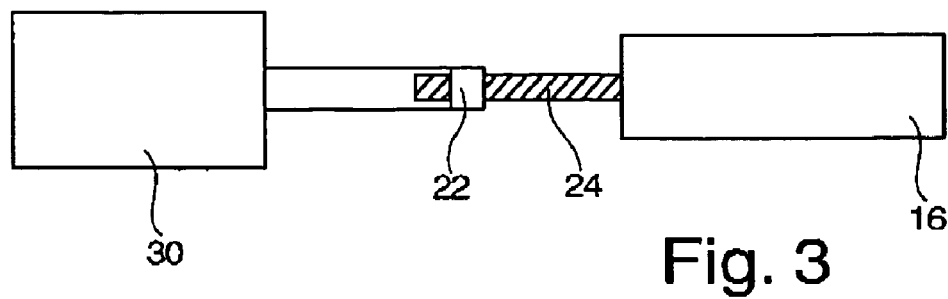
FIG. 3 shows an embodiment with a spindle nut disposed on the electromotor and the spindle on the working piston.
Figure 4:
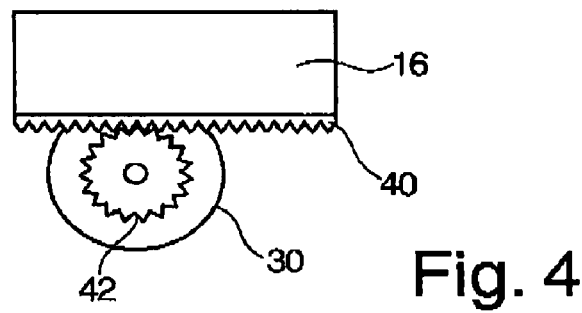
FIG. 4 shows an embodiment with a rack disposed on the working piston coupled to a pinion cooperating with the electromotor.
Figure 5:
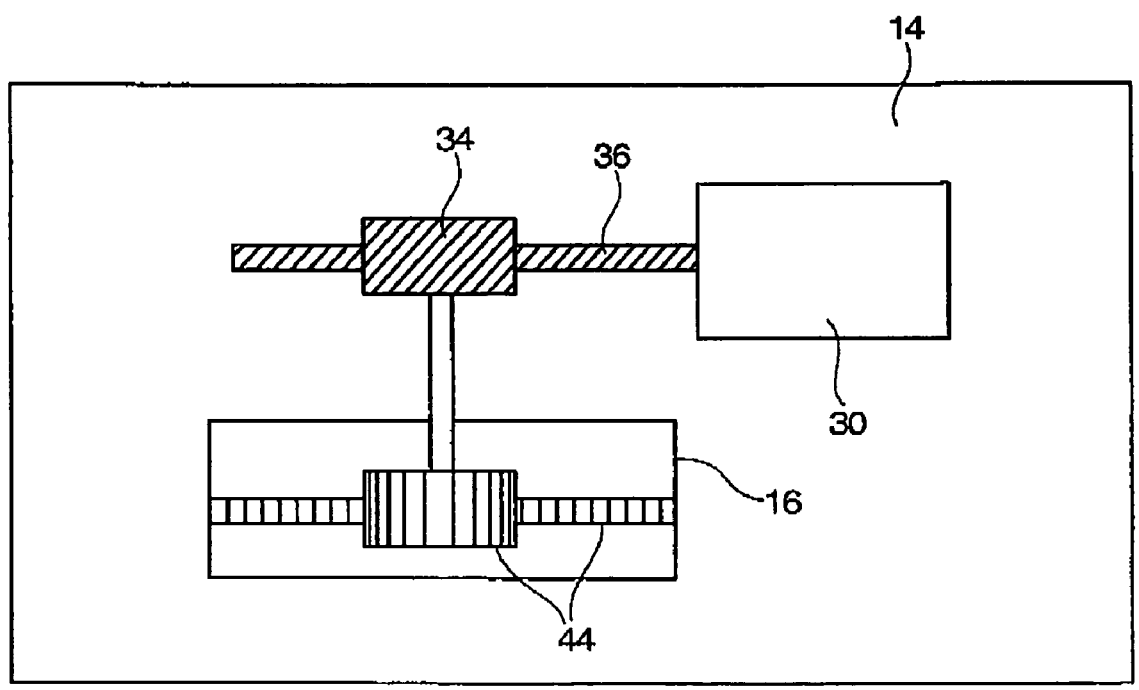
FIG. 5 shows a worm and worm wheel of the electromotor cooperating with a rotary rack and pinion coupling to the working piston.

FIG. 3 shows an embodiment of the invention in which mechanical coupling between the electromotor 30 and the working piston 16 incorporates a spindle nut 22 cooperating with the electromotor and spindle 24 cooperating with the working piston 16. In FIG. 4, the mechanical coupling is effected by a toothed rack 40 disposed on the working piston 16 and a pinion 42 driven by the electromotor 30. The mechanical coupling means of FIG. 5 comprise a worm wheel 34 which is rotated by said working piston 16 via a rotary coupling 44 and a worm 36 which is driven by the electromotor 30. The electromotor 30 is disposed within the housing 14.

We claim:

1. A rotary or pivotal unit, the unit structured to be driven by a loading fluid pressure medium, the unit cooperating with a rotatably disposed pivoting member for disposition of gripping means, the unit comprising:
    a housing;
    a cylinder disposed in said housing;
    a working piston disposed in said cylinder;
    a rotary coupling disposed in said housing and cooperating with said working piston and the pivoting member, wherein an axial motion of said working piston in said cylinder induces rotation of said rotary coupling and pivoting of the pivoting member;
    a motor; and
    means for mechanically coupling said working piston to said motor in a manner which is not self-locking, wherein said motor decelerates and/or drives said working piston in an axial direction.

2. The unit of claim 1, wherein said mechanical coupling means comprise a spindle nut or spindle rod disposed on said working piston and a spindle rod or a spindle nut driven by said motor.

3. The unit of claim 2, wherein said spindle nut cooperates with and does not rotate with respect to said working piston, said spindle rod being disposed for rotation within said spindle nut, said spindle rod having a free end facing away from said working piston, which is connected to a drive shaft of said motor for secure mutual rotation therewith.

4. The unit of claim 3, wherein a free end of said spindle rod facing away from said motor is disposed within said working piston, said working piston having a closed side facing away from said motor.

5. The unit of claim 1, wherein said mechanical coupling means comprise a toothed rack which is disposed on said working piston, and a pinion which is driven by said motor.

6. The unit of claim 1, wherein said mechanical coupling means comprise a worm wheel which is rotated by said working piston via a rotary coupling, and a worm which is driven by said motor to engage said worm wheel.

7. The unit of claim 1, wherein said motor is flanged to said housing.

8. The unit of claim 1, wherein said motor is disposed within said housing.

9. The unit of claim 1, further comprising a regulation and/or control unit to control said motor in dependence on a position of said working piston, a temporal change of position of said working piston, a respective pressure in said cylinder, and/or a temporal change of a respective pressure in said cylinder.

10. The unit of claim 1, further comprising a regulation and/or control unit to directly control pressure in pressure chambers of said cylinder when a limit load of said motor has been reached, to reduce a motor load, and/or to support motion of said working piston effected or controlled by said motor.

11. A method for operating the unit of claim 1, the method comprising the step of:
    a) rotating said motor substantially without load when said cylinder is loaded to move said working piston or rotating said motor to support motion of said working piston; and
    b) controlling said motor to decelerate motion of said working piston upon or shortly before reaching a target position of said working piston.

12. The method of claim 11, further comprising reducing pressure in a respective pressure chamber of said cylinder and/or building up a counter pressure upon or shortly before reaching a target position of said working piston.

13. The method of claim 11, further comprising driving said motor in dependence on a position of said working piston, a temporal change of said position of said working piston, a respective pressure in pressure chambers of said cylinder, and/or a temporal change of respective pressure in said pressure chambers of said cylinder.

14. The method of claim 11, further comprising controlling a respective pressure in pressure chambers of said cylinder when a limit load on said motor has been reached to reduce a motor load and/or to support motion of said working piston effected or controlled by said motor.

\* \* \* \* \*